United States Patent
Tiwari et al.

(10) Patent No.: US 6,609,209 B1
(45) Date of Patent: Aug. 19, 2003

(54) METHOD AND APPARATUS FOR REDUCING THE POWER CONSUMED BY A PROCESSOR BY GATING THE CLOCK SIGNAL TO PIPELINE STAGES

(75) Inventors: Vivek Tiwari, Santa Clara, CA (US); Vinod Sharma, San Jose, CA (US); Sivakumar Makineni, Sunnyvale, CA (US); Suri B. Medapati, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,461

(22) Filed: Dec. 29, 1999

(51) Int. Cl.$^7$ ................................................. G06F 1/32
(52) U.S. Cl. ...................................................... 713/322
(58) Field of Search ................................. 713/300, 320, 713/322, 600, 601

(56) References Cited

U.S. PATENT DOCUMENTS

| | | | | |
|---|---|---|---|---|
| 5,918,042 A | * | 6/1999 | Furber | .......................... 713/600 |
| 6,122,751 A | * | 9/2000 | Janssens et al. | ............. 713/600 |
| 6,247,134 B1 | * | 6/2001 | Sproch et al. | ............... 713/320 |

* cited by examiner

*Primary Examiner*—Thomas M. Heckler
(74) *Attorney, Agent, or Firm*—Blakely, Sokoloff, Taylor & Zafman LLP

(57) ABSTRACT

A processor includes a pipeline having first and second stages and a shift register having first and second latches. An interface circuit is used to provide a clock signal from a clock signal line to the first and second stages based, at least in part, on first and second bits to be stored in the first and second latches, respectively.

25 Claims, 5 Drawing Sheets

METHOD AND APPARATUS FOR REDUCING THE POWER CONSUMED BY A PROCESSOR BY GATING THE CLOCK SIGNAL TO PIPELINE STAGES

The present invention relates to computer systems and more particularly to reducing the power consumed by a processor within the computer system.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by the processor, and hence its speed, has been limited by two factors. First, as power consumption increases, the processor tends to run hotter, leading to thermal dissipation problems. Second, the power consumed by a processor may tax the limits of the power supply used to keep the processor operational, reducing battery life in mobile systems and diminishing reliability while increasing cost in larger systems.

Processor and computer system designers have developed numerous methods to deal with these issues. For example, processor designers implement specialized circuit design techniques that shut down the processor (or place the processor into a low power "sleep" mode) when the processor is idle for an extended period of time. Unfortunately, this technique may cause the computer system to be inefficient due to the latency associated with placing a processor into sleep mode and pulling the processor back out of sleep mode. For example, this technique may be unsuitable for placing the processor into a low power mode for short periods of time. What is needed is a faster and more dynamic power control technique.

The present invention addresses this and other problems associated with the prior art.

SUMMARY OF THE INVENTION

In accordance with one embodiment of the present invention, a processor includes a pipeline having first and second stages and a shift register having first and second latches. An interface circuit is used to provide a clock signal from a clock signal line to the first and second stages based, at least in part, on first and second bits to be stored in the first and second latches, respectively.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

Figure 1:
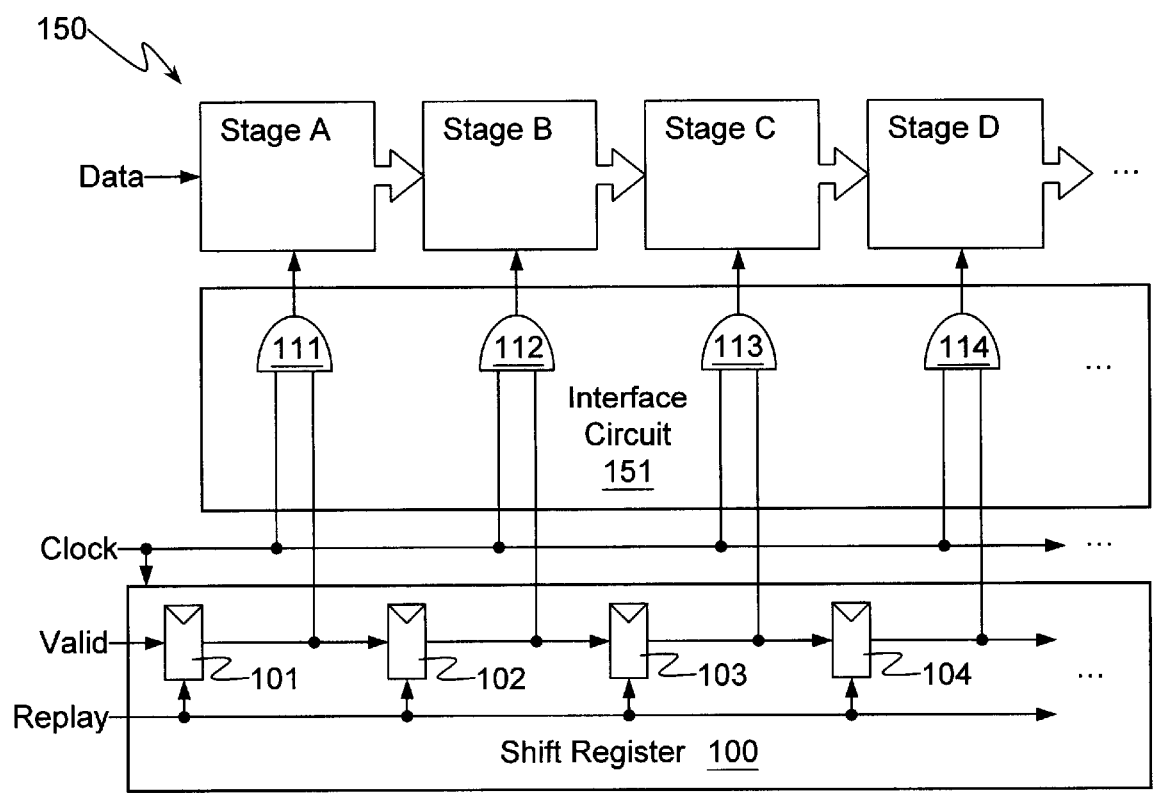
FIG. 1 is a processor pipeline interface circuit in accordance with an embodiment of the present invention.

In accordance with one embodiment of the present invention, a computer system includes a processor, a system clock to provide a clock signal to the processor, and a power supply to supply power to the processor. The processor includes a pipeline, a shift register, and an interface circuit. Data being forwarded through the stages of the pipeline proceeds in tandem with bits being shifted through the latches of the shift register. Each latch of the shift register has an associated stage, and each bit has associated data. The value of each bit indicates the validity of its associated data. The clock signal and bit values are provided to the interface circuit.

In accordance with one embodiment of the present invention, the interface circuit includes logic gates that provide the clock signal to a stage of the pipeline only when a bit stored in the latch associated with the stage indicates that the associated data in the stage is valid. In other words, for this embodiment, the interface circuit prevents the clock signal from reaching a stage of the pipeline if a bit stored in the latch associated with the stage indicates that the associated data in the stage is invalid. In this manner, power consumption is reduced.

In accordance with another embodiment of the present invention, the interface circuit includes logic gates that provide the clock signal to multiple stages of the pipeline when any one of the bits stored in the stages' associated latches indicate that the bit's associated data is valid. In other words, for this embodiment, the interface circuit prevents the clock signal from reaching multiple stages of the pipeline only when all of the bits stored in the latches associated with the multiple stages indicate that the associated data is invalid. In this manner, power consumption is reduced.

A more detailed description of embodiments of the present invention, including various configurations and implementations, is provided below.

As used herein, to state that a first element is associated with a second element inherently indicates that the second element is associated with the first element. For example, to state that a bit is associated with data or that a latch is associated with a pipeline stage is to inherently indicate that the data is associated with the bit and the stage is associated with the latch, respectively. In addition, data associated with a latch refers to the data in a pipeline stage that is associated with the latch at a particular point in time. Similarly, a bit associated with a pipeline stage refers to a bit in a latch that is associated with the stage at a particular point in time.

Although embodiments described herein presume a particular logical definition, other definitions may be implemented in accordance with other embodiments of the present invention. For example, a bit that indicates its associated data is valid is described below as having a logical value of "1". For an alternate embodiment of the present invention, however, a bit that indicates that its associated data is valid may have a logical value of "0", and the circuits described below may be appropriately modified to accommodate this alternate definition.

FIG. 1 is a processor pipeline interface circuit in accordance with an embodiment of the present invention. Pipeline 150 includes Stages A, B, C, and D, as shown, but may include additional stages, and shift register 100 includes associated latches 101, 102, 103, and 104, respectively, as shown, but may include additional latches to support additional pipeline stages. Interface Circuit 151 includes AND gates 111, 112, 113, and 114, as shown, but may also include additional logic gates to support additional pipeline stages.

During a first clock cycle, data is provided to the input of Stage A of pipeline 150 and an associated validity bit is provided to latch 101 of FIG. 1. The validity bit may be generated in an earlier stage of the pipeline, such as the decode stage. The validity bit indicates whether or not the associated data is valid. In accordance with the embodiment of the FIG. 1, the validity bit is "1" if the associated data is valid, and is "0" if the associated data is invalid. As used herein, valid data is data that will be (or has the potential to be) used to modify the architectural state of the processor. Invalid data is data that will have no effect on the architectural state. For example, invalid data includes a no-op (null operation), an invalid operation, or no data (e.g. a read from an invalid register). In addition, invalid data, as used herein, includes any data that will not be retired and committed to an architectural state such as data in a portion of a pipeline that has been flushed or replayed.

During a second clock cycle, the data is manipulated within Stage A or is used to manipulate or access other data in Stage A. For example, if Stage A is a register read stage, the data may be a register address to be read from a register stack. If Stage A is an execution stage, the data may be a numeric value to be added to another value. Note that although the invalidity bit is associated with data, the character, meaning, and value of this data may change as the data is forwarded from one stage to another through the pipeline.

During the second clock cycle, the validity bit associated with the data is provided from latch 101 of shift register 100 of FIG. 1 to an input of AND gate 111 of Interface Circuit 151. Another input to AND gate 111 receives the clock signal from the clock signal line. If the validity bit in latch 101 indicates that the data in Stage A of pipeline 150 is valid, the clock signal is provided to Stage A from the output of AND gate 111, and data processing proceeds normally. If, however, the validity bit indicates that the data in Stage A is invalid, the clock signal is prevented from being provided to Stage A by AND gate 111. Without the clock signal, Stage A does not process the associated data, and, consequently, power consumption is reduced.

During a third clock cycle, the data, after having been forwarded to Stage B of FIG. 1, is manipulated within Stage B or is used to manipulate or access other data in Stage B. The validity bit associated with the data, after having been shifted to latch 102 (as controlled by the clock signal), is provided from latch 102 to an input of AND gate 112 of Interface Circuit 151. Another input to AND gate 112 receives the clock signal from the clock signal line. If the validity bit in latch 102 indicates that the data in Stage B of pipeline 150 is valid, the clock signal is provided to Stage B from the output of AND gate 112, and data processing proceeds normally. If, however, the validity bit indicates that the data in Stage B is invalid, the clock signal is prevented from being provided to Stage B by AND gate 112. Without the clock signal, Stage B does not process the associated data, and, consequently, power consumption is reduced.

In addition, during the third clock cycle, separate data, after having been forwarded to Stage A of FIG. 1, is manipulated within Stage A or is used to manipulate or access other data in Stage A. A separate validity bit associated with the data, after having been shifted into latch 101, is provided from latch 101 to an input of AND gate 111. The other input to AND gate 111 receives the clock signal from the clock signal line. If the validity bit in latch 101 indicates that the data in Stage A of pipeline 150 is valid, the clock signal is provided to Stage A from the output of AND gate 111, and data processing proceeds normally. If, however, the validity bit indicates that the data in Stage A is invalid, the clock signal is prevented from being provided to Stage A. Without the clock signal, Stage A does not process the associated data, and, consequently, power consumption is reduced.

Data processing continues in this manner, with each bit of each latch in shift register 100 being shifted in tandem with the forwarding of associated data in the latches of pipeline 150 under control of the clock signal. In accordance with the embodiment of FIG. 1, a replay pipeline is used. A replay pipeline is a pipeline that does not stall on a hazard. Instead, if a hazard occurs, the pipeline, or a portion thereof, is flushed, and the instructions are re-executed (or "replayed"). On a replay, a Replay signal is provided to shift register 100 as shown. The replay signal effectively flushes pipeline 150 by among other things, resetting the bits stored in the latches of the shift register to indicate that all data in pipeline 150 (or a portion thereof is invalid. Thus, in the manner described above, the clock signal will not be applied to the stages of this portion of the pipeline, thereby reducing power consumption.

When the instructions are replayed, the clock signal is reapplied to the appropriate stages as the new, valid data is forwarded through the pipeline. For an alternate embodiment of the present invention, the clock signal is provided to a stage one or more clock cycles before the valid data enters the stage, while invalid data is still in the stage. Alternatively, the clock signal may be provided to a stage a fraction of a clock cycle before the valid data enters the stage. These embodiments may be found useful to stabilize or pre-charge circuits within a stage before valid data enters and is manipulated within the stage.

In accordance with one embodiment of the present invention, the data latches of each pipeline stage are at the stage input. For this embodiment the validity bit may arrive at the latch associated with the stage at least one clock cycle ahead of its associated data. In accordance with another embodiment, the data latches of each pipeline stage are at the stage output. For this embodiment, the validity bit may arrive at the latch associated with the stage at the same time as the associated data.

Figure 2:
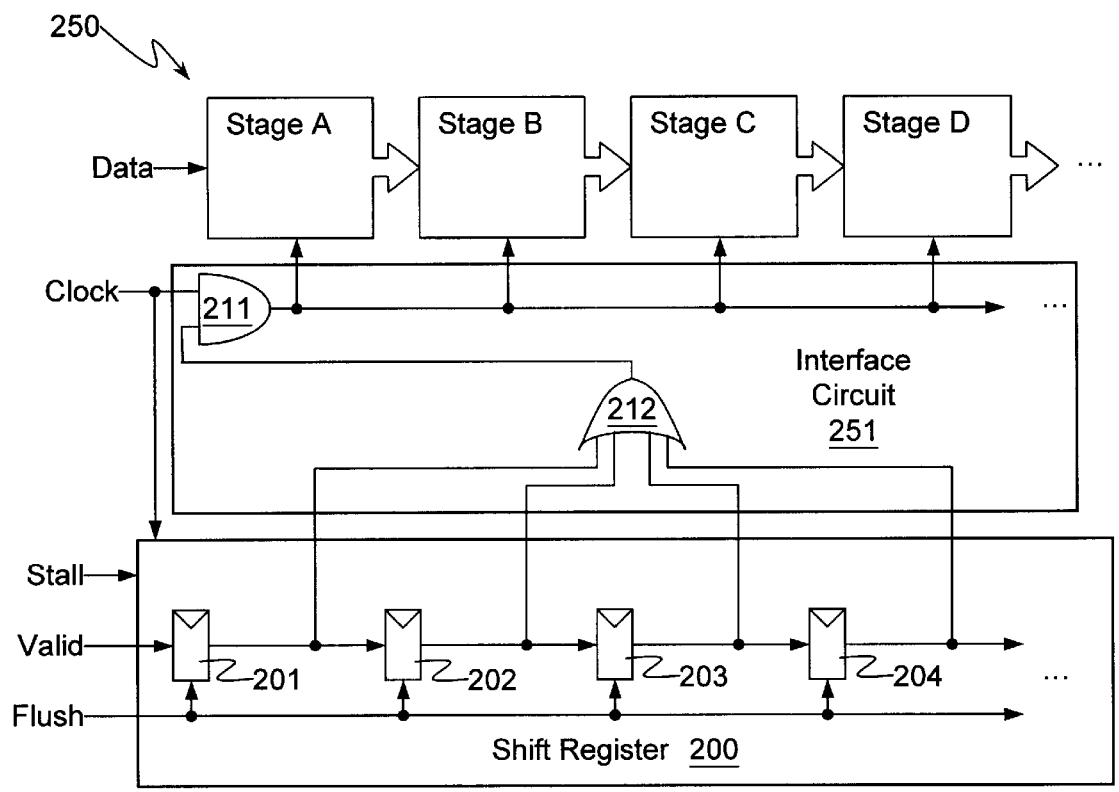
FIG. 2 is a processor pipeline interface circuit in accordance with another embodiment of they present invention.

FIG. 2 is a processor pipeline interface circuit in accordance with an alternate embodiment of the present invention. Pipeline 250 includes Stages A, B, C, and D, as shown, but may include additional stages, and shift register 200 includes associated latches 201, 202, 203, and 204, respectively, as shown, but may include additional latches to support additional pipeline stages. Interface Circuit 251 includes OR gate 212 and AND gate 111, as shown.

FIG. 2 operates in much the same manner as described above for FIG. 1, the two primary differences being that pipeline 250 of FIG. 2 is a non-replay (i.e. stalling) pipeline, and the interface circuit of FIG. 2 implements alternative control logic. Because the pipeline of FIG. 2 is a non-replay pipeline, the pipeline is stalled (or frozen or halted) upon the detection of a data hazard. Detecting a hazard in the pipeline also causes a stall signal to be applied to shift register 200, stalling the shifting of validity bits between latches. In this manner, bit shifting in shift register 200 and data forwarding in pipeline 250 proceed in tandem, stalling and progressing according to the clock and stall signals.

The alternative control logic in interface circuit 251 of FIG. 2 implements a slightly different clock gating function than that described above in conjunction with FIG. 1. According to interface circuit 251 of FIG. 2, the validity bits stored in multiple latches, including latches 201–204, are ORed together by OR gate 212. The output of OR gate 212 is ANDed with the clock signal by AND gate 211, and the output of AND gate 211 is applied to Stages A, B, C, and D, associated with latches 201, 202, 203, and 204, respectively. As a result, the clock signal is applied to Stages A–D if any of the validity bits in latches 201–204 indicate that its associated data is valid. If all of the validity bits in latches 201–204 indicate that the associated data in Stages A–D is all invalid, then the clock signal is prevented from being provided to Stages A–D by AND gate 211 of Interface Circuit 251.

Figure 3:
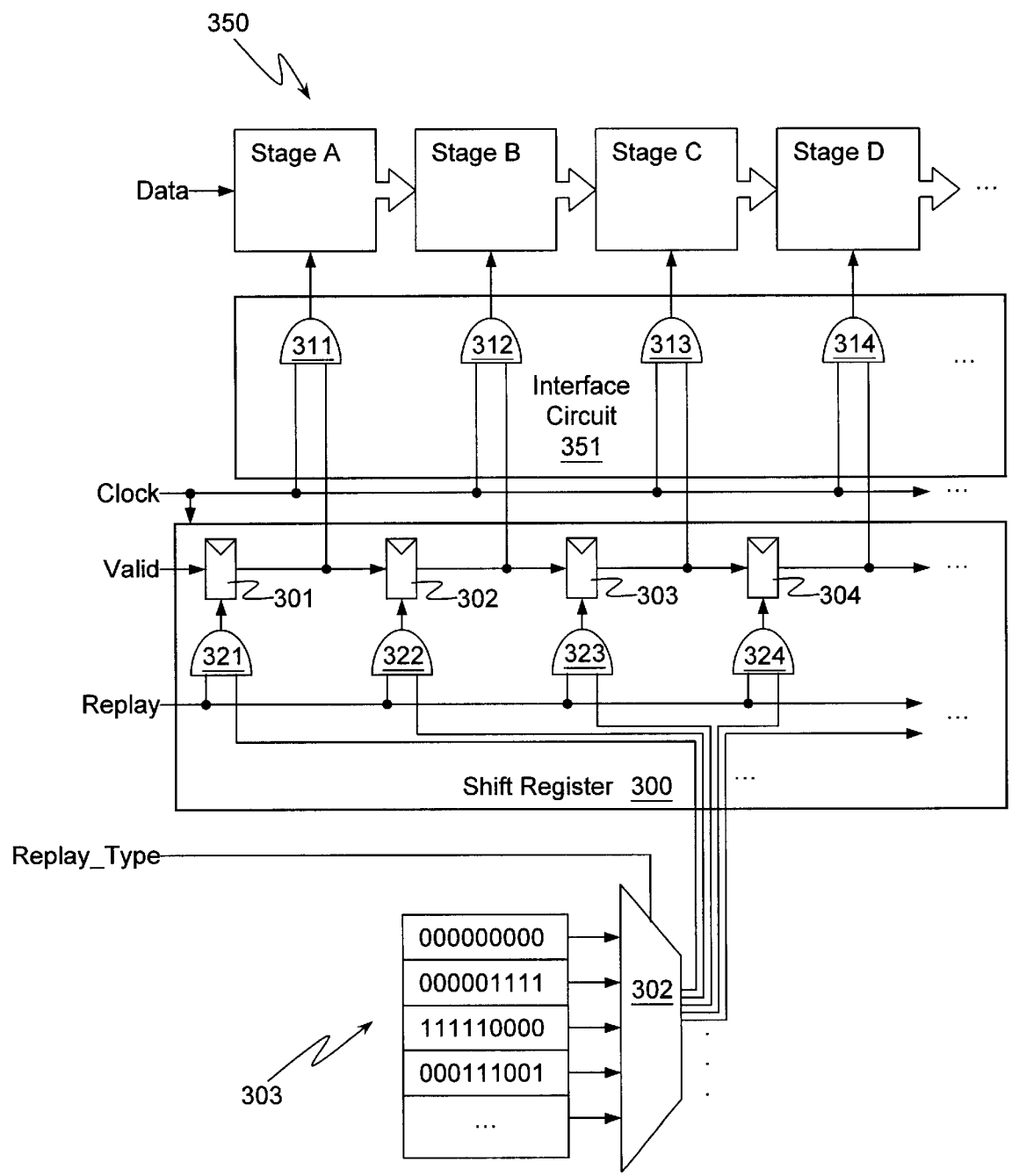
FIG. 3 is a processor pipeline interface circuit in accordance with another embodiment of the present invention.

FIG. 3 is a processor pipeline interface circuit in accordance with another embodiment of the present invention. Pipeline 350 includes Stages A, B, C, and D, as shown, but may include additional stages, and shift register 300 includes associated latches 301, 302, 303, and 304, respectively, as shown, but may include additional latches to support additional pipeline stages. Interface Circuit 351 includes AND gates 311, 312, 313, and 314, as shown, but may also include additional logic gates to support additional pipeline stages. Initialization array 303 is coupled to shift register 300 via multiplexer 302.

FIG. 3 operates in much the same manner as described above for FIG. 1, the primary difference being that the validity bits stored in latches 301–304 may not all be reset to the same value upon a replay of the pipeline. Instead, a set of initial values for the validity bits is selected from initialization array 303 according to a Replay_Type signal. Initialization array 303 may be a predefined ROM storage location or a dynamically set RAM storage location. For the example shown in FIG. 3, at least four sets of initial values are shown in initialization array 303, each set including ten bits for resetting the validity bits of ten latches of shift register 303 associated with ten stages of pipeline 350. For an alternate embodiment of the present invention, an initialization array may include any number of sets of initial values, each set including any number of bits for resetting the validity bits of a shift register associated with any number of stages of a pipeline.

As an example of the operation of the circuit of FIG. 3, consider what happens when the entire pipeline (or at least ten stages thereof) are replayed. On such a replay, all ten stages must be flushed, in which case the Replay_Type signal, which is coupled to the control input of multiplexer 302, selects the first set of initial values from initialization array 303, "0000000000." Each bit of this set of initial values is applied to one of the inputs of ten AND gates of shift register 300 (note that only 4 AND gates, 321–324, are shown for convenience). For example, the first bit, "0", of the initial set is provided to AND gate 321. The second bit, "0", of the set is provided to AND gate 322. The third bit, "0", of the set is provided to AND gate 323, and so forth. When the Replay signal is activated by sending a "1" to the other inputs of the AND gates, this set of initial values is entered into latches 301, 302, 303, 304, and so forth.

As another example of the operation of the circuit of FIG. 3, consider what happens when only the front end of pipeline 350 (or at least the first five stages thereof) are replayed. On such a replay, the five front-end stages must be flushed, in which case the Replay_Type signal, which is coupled to the control input of multiplexer 302, selects the second set of initial values from initialization array 303, "0000011111." Each bit of this set of initial values is applied to one of the inputs of ten AND gates of shift register 300. For example, the first bit, "0", of the initial set is provided to AND gate 321. The second bit, "0", of the set is provided to AND gate 322. The third bit, "0", of the set is provided to AND gate 323, and so forth. When the Replay signal is activated by sending a "1" to the other inputs of the AND gates, this set of initial values is entered into latches 301, 302, 303, 304, and so forth. The third set of initial values in initialization array 303 may be selected by the Replay_Type signal to support a back-end flush of the pipeline.

Figure 4:
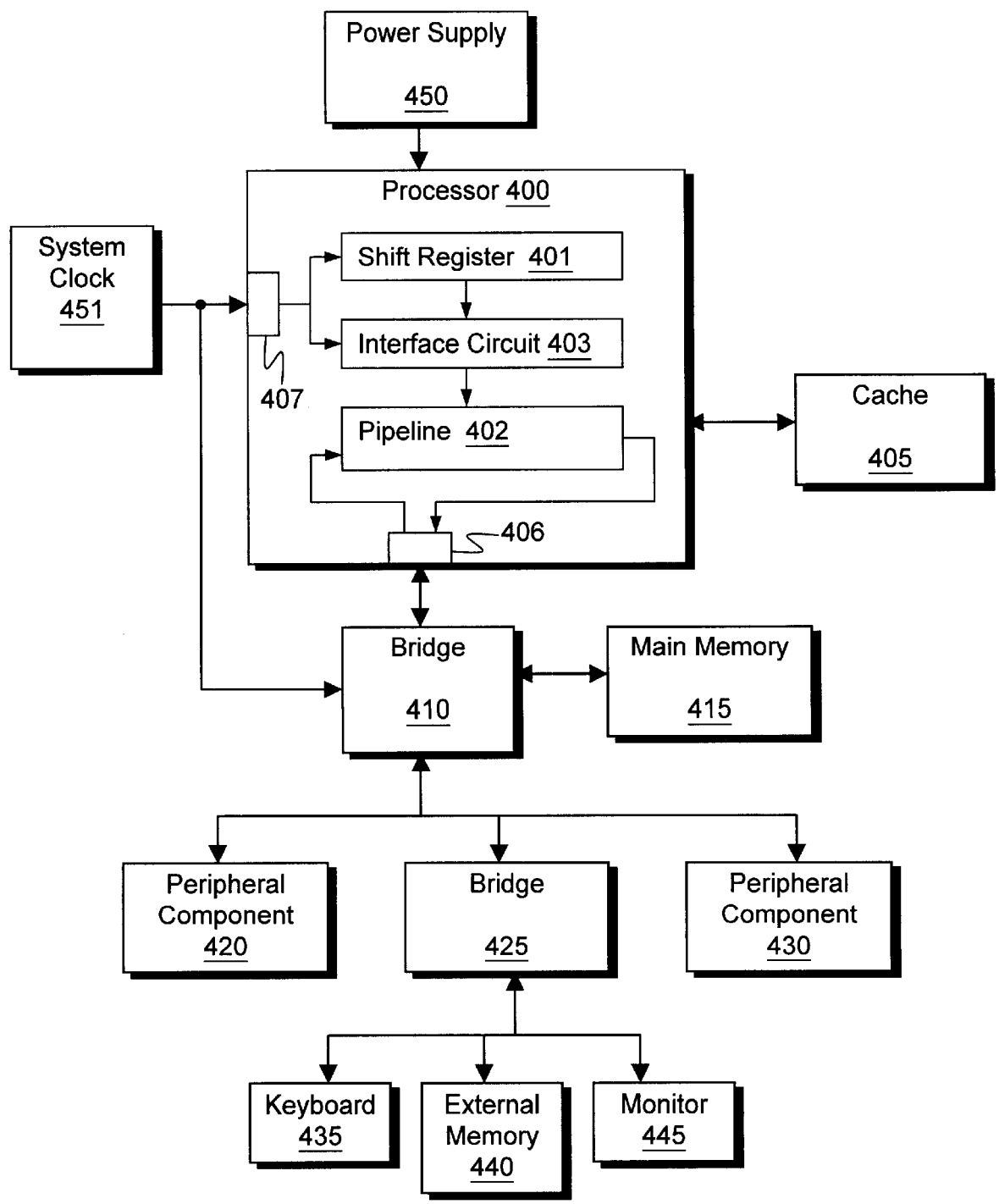
FIG. 4 is a computer system formed in accordance with an embodiment of the present invention.

FIG. 4 is a computer system formed in accordance with an embodiment of the present invention. System clock 451 provides a clock signal to processor 400 and bridge 410 via a clock signal line, and power supply 450 provides power to processor 400. Processor 400 includes a clock interface 407 to receive the clock signal from system clock 451, and to provide the clock signal (multiplied to achieve a higher frequency), via a clock signal line, to shift register 401 and to interface circuit 403. Shift register 401 is coupled to interface circuit 403 which is, in turn, coupled to pipeline 402. Pipeline 402 is coupled to bus interface 406 to which bridge 410 is coupled, and cache 405 is coupled to processor 400. Bridge 410 is used to couple processor 400 to main memory 415 and to peripheral components 420 and 430. Bridge 425 couples keyboard 435, external memory 440, and monitor 445 to bridge 410.

Peripheral components 420 and 430 of FIG. 4 may include audio and video input/output devices such as audio/video generators, accelerators, or analyzers. External memory 440 may include a hard drive, floppy disk, tape drive, DVD-ROM, or other non-volatile, machine-readable, storage medium. Cache 405 and main memory 415 may include DRAM, SRAM, or other volatile or non-volatile, machine-readable, storage medium. Power Supply 450 may be a voltage regulator.

Data is received by a first stage of pipeline 402 via bus interface 406 coupled to bridge 410 or from cache 405. The validity of this data is determined and a bit is entered into a first latch of shift register 401 that reflects the validity. The bit is then shifted through contiguous, sequential latches of shift register 401 in tandem with the forwarding of the data through contiguous, sequential stages of pipeline 402. Depending on the bit in shift register 401, interface circuit 403 may or may not provide a clock signal from the clock signal line to the associated stage of pipeline 402. When the clock signal is prevented from being provided to a stage of pipeline 402, the overall power consumed by processor 400 from power supply 450, may be reduced.

Figure 5:
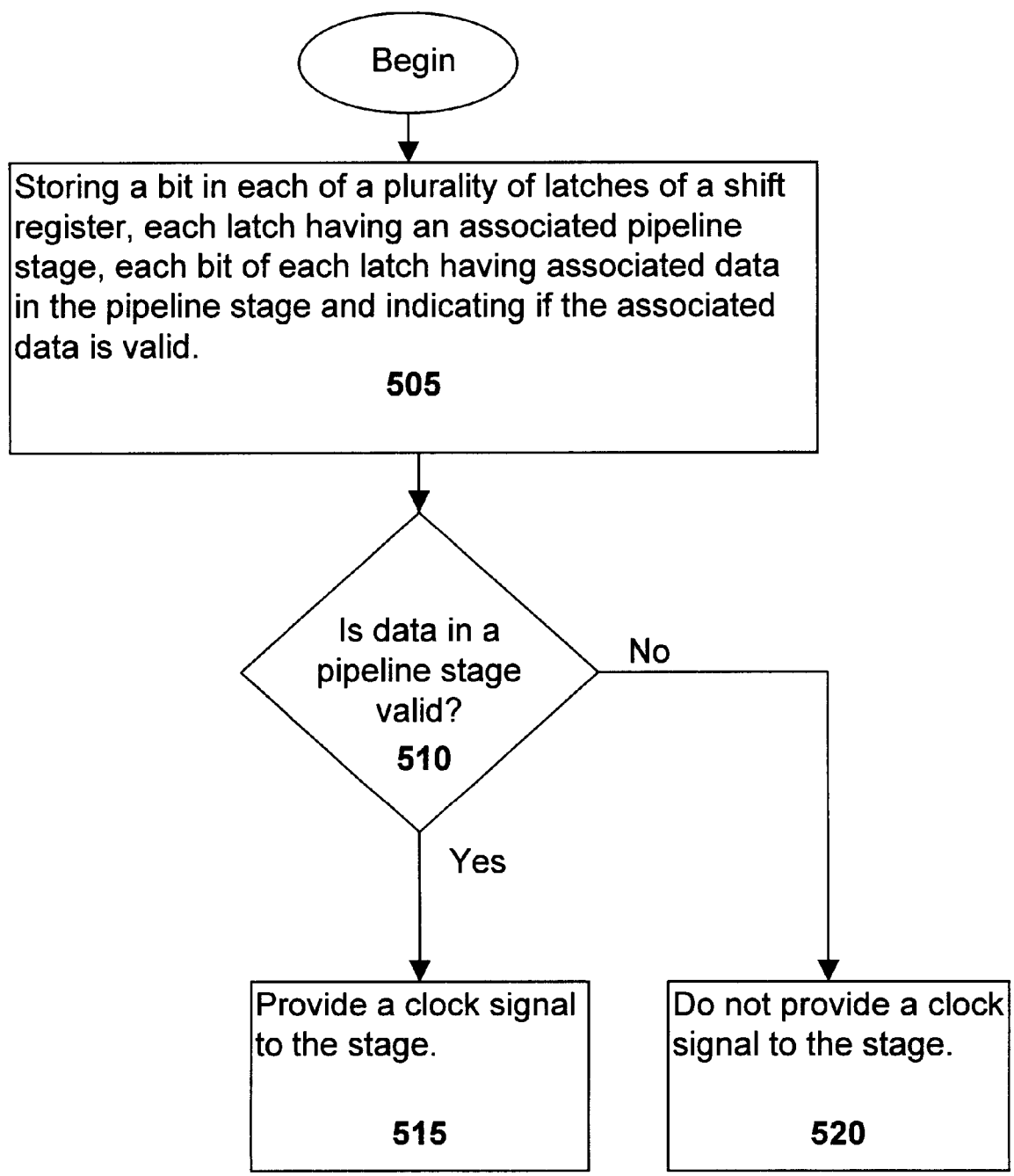
FIG. 5 is a flow chart showing a method of the present invention.

FIG. 5 is a flow chart showing a method of the present invention. At step 505, a bit is stored in each of a plurality of latches of a shift register. Each latch of the plurality of latches has an associated pipeline stage, and each bit stored in each latch has associated data in the associated pipeline stage. Each bit indicates if its associated data is valid.

At step 510 it is determined if the data in a particular pipeline stage is valid based, at least in part, on the associated bit. If it is determined that the data is not valid, the process proceeds to step 520. At step 520, a clock signal is not provided (or is prevented from being provided) to the particular pipeline stage, and power consumption is reduced. If, however, it is determined at step 510 that the data is valid, the process proceeds to step 515. At step 515, a clock signal is provided to the particular pipeline stage.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
    a pipeline having first and second stages;
    a shift register having first and second latches; and
    an interface circuit to provide a clock signal from a clock signal line to the first and second stages based, at least in part, on first and second bits to be stored in the first and second latches, respectively.

2. The processor of claim 1, wherein the clock signal line is coupled to the shift register to provide the clock signal to the shift register to control shifting of bits from the first latch to the second latch.

3. The processor of claim 2, wherein the clock signal, when provided to the first and second stages, clocks forwarding of data from the first stage to the second stage.

4. The processor of claim 3, wherein the first and second bits indicate if data in the first and second stages, respectively, is valid.

5. The processor of claim 4, wherein the interface circuit includes a plurality of logic gates to provide the clock signal to the first stage if the first bit indicates that data in the first stage is valid, and to provide the clock signal to the second stage if the second bit indicates that data in the second stage is valid.

6. The processor of claim 4, wherein the interface circuit includes a plurality of logic gates to provide the clock signal to both the first and second stages if either the first or second bit indicates that data in either the first or second stage is valid.

7. The processor of claim 1, wherein the interface circuit includes a plurality of logic gates to provide the clock signal to the first stage if data in the first stage is valid, and to provide the clock signal to the second stage if data in the second stage is valid, the first and second bits to indicate, at least in part, if data in the first and second stages, respectively, is valid.

8. The processor of claim 7, wherein the pipeline is a replay pipeline.

9. The processor of claim 7, wherein the pipeline is a non-replay pipeline.

10. The processor of claim 1, wherein the interface circuit includes a plurality of logic gates to provide the clock signal to the first and second stages if data in either the first or second stage is valid, the first and second bits to indicate, at least in part, if data in the first and second stages, respectively, is valid.

11. The processor of claim 1, further comprising an initialization array to store a first set of initial values for the first and second bits to be stored in the first and second latches, respectively, upon a replay of the pipeline.

12. The processor of claim 11, wherein the initialization array is to further store a second set of initial values for the first and second bits to be stored in the first and second latches, respectively, upon a replay of the pipeline, selection between the first and second sets of initial values to be determined, at least in part, by a replay type.

13. The processor of claim 11, wherein the interface circuit includes a plurality of logic gates to provide the clock signal to the first stage if data in the first stage is valid, and to provide the clock signal to the second stage if data in the second stage is valid, the first and second bits to indicate, at least in part, if data in the first and second stages, respectively, is valid.

14. A computer system comprising:
    a processor;
    a system clock to provide a clock signal to the processor;
    a power supply to supply power to the processor;
    a pipeline of the processor having a plurality of stages;
    a shift register having a plurality of latches, each latch being associated with one of the stages; and
    an interface circuit coupled to the pipeline and the shift register to provide the clock signal to each stage based, at least in part, on a bit to be stored in each stage's associated latch and to reduce the power supplied by the power supply by preventing the clock signal from being provided to each stage based, at least in part, on a bit to be stored in each stage's associated latch.

15. The system of claim 14, wherein each bit to be stored in each stage's associated latch indicates, at least in part, if data in an associated stage is valid.

16. The system of claim 15, further comprising a clock signal line coupled to the shift register to provide the clock signal to the shift register to control shifting of bits between the latches.

17. The system of claim 15, wherein the interface circuit includes a plurality of logic gates to prevent the clock signal from being provided to the plurality of stages if data in all of the plurality stages is invalid.

18. The system of claim 16, wherein the interface circuit includes a plurality of logic gates to prevent the clock signal from being provided to a stage of the plurality of stages if data in the stage is invalid.

19. The system of claim 18, further comprising an initialization array to store a first set of initial values for each bit to be stored in each latch upon a replay of the pipeline.

20. The system of claim 19, wherein the initialization array is to further store a second set of initial values for each bit to be stored in each latch upon a replay of the pipeline, selection between the first and second sets of initial values to be determined, at least in part, by a replay type.

21. A method of operating a processor comprising:
    storing a bit in each of a plurality of latches of a shift register, each latch having an associated pipeline stage of a pipeline, each bit of each latch having associated data in the pipeline stage and indicating if the associated data is valid; and
    providing a clock signal to a pipeline stage if data in the stage is valid, as determined, at least in part, by its associated bit.

22. The method of claim 21, further comprising flushing at least a portion of the pipeline, and initializing the latches of the shift register.

23. The method of claim 21, further comprising replaying at least a portion of the pipeline, and initializing the latches of the shift register.

24. The method of claim 23, wherein initializing the latches includes loading a set of initial values from an initialization array into the latches.

25. The method of claim 21, further comprising shifting each bit of each latch in tandem with forwarding the associated data.

* * * * *